Figure 1:
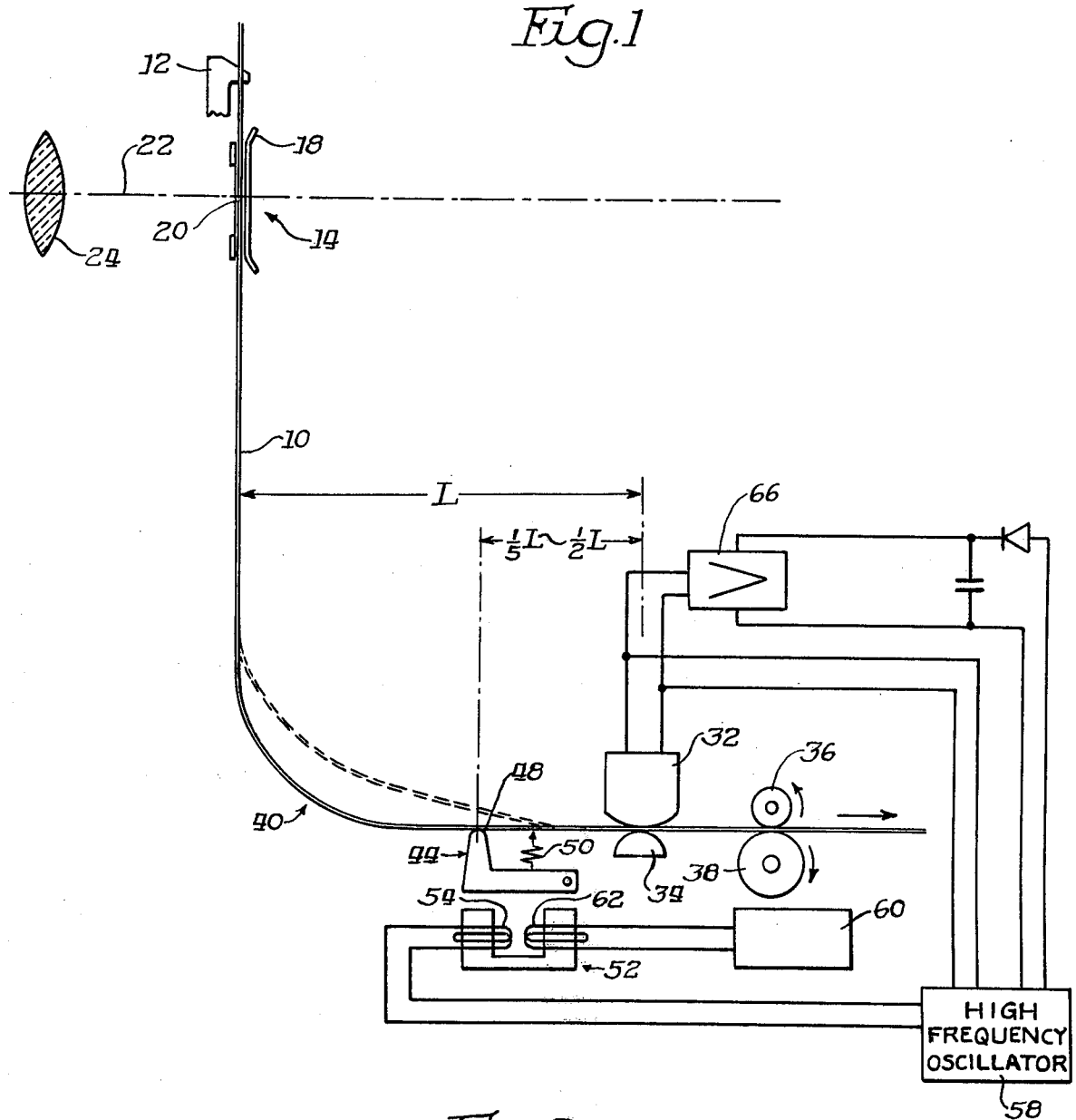

United States Patent [19]
Saito

[11] 3,942,882
[45] Mar. 9, 1976

[54] FILM TRANSPORT SPEED CONTROLLING DEVICE

[75] Inventor: Fumio Saito, Kawaguchi, Japan

[73] Assignees: Bell & Howell Japan, Ltd.; Nihon Beru-Haueru Kabushiki Kaisha, both of Tokyo, Japan

[22] Filed: July 15, 1974

[21] Appl. No.: 488,869

[30] Foreign Application Priority Data
July 30, 1973 Japan................................ 48-86058

[52] U.S. Cl. ..................... 352/14; 226/44; 352/21; 352/29; 352/30; 352/180
[51] Int. Cl.² ........................................ G03B 21/48
[58] Field of Search ........... 352/14, 21, 29, 30, 180; 226/44

[56] References Cited
UNITED STATES PATENTS 3,154,011   10/1964   Gottscho et al. ..................... 226/44
3,244,469   4/1966   Hennessey et al. .................... 352/14

*Primary Examiner*—L. T. Hix
*Assistant Examiner*—Russell E. Adams, Jr.
*Attorney, Agent, or Firm*—John E. Peele, Jr.

[57] ABSTRACT

Disclosed is a film speed control device for a single-system sound camera capable of simultaneous picture/sound recording in which an intermittent film transport mechanism at the exposure station and a constant speed film transport mechanism at a sound station having a magnetic recording head are driven synchronously by separate drive motors. In the control device, the impedance of a high frequency coil is changed in response to changes in the size of a film loop between the stations to control the rate of operation of the intermittent film transport so as to maintain constant the size of the film loop. The output of the high frequency oscillator is used for AC bias for the magnetic recording head, and is rectified for use as a power source for the recording amplifier.

5 Claims, 2 Drawing Figures

U.S. Patent  March 9, 1976  3,942,882

FILM TRANSPORT SPEED CONTROLLING DEVICE

The invention relates to a motion picture camera and particularly to a control device for components of a motion picture camera having a sound system by which audio is recorded on a film simultaneously with exposure of a picture.

Motion picture cameras have been provided with systems for recording sound at the same time as a series of pictures are exposed. However, until recently, most of the sound systems for cameras available for the home user required independent tape recorders, which were coupled electrically or electro-mechanically to the camera. Recently, "single-system" sound cameras and film supplies have been made available by which a camera is provided with an internal audio recording capability. These units enable recording sound simultaneously with pictures on a single film.

In the type of single system sound motion picture cameras being considered, the film is transported through an exposure station by an intermittent mechanism. Further, the film is transported through a sound recording station by a constant speed mechanism. Since these mechanisms are driven respectively by independent motors, variations may occur between the quantities of film transported through the respective stations thereby causing loss of picture-sound synchronization. Variations in the rates of film movement can be detected through increase or decrease of a film loop between the stations. By modifying the rate of film movement by the intermittent mechanism relative to the rate of film movement through the sound station, picture-sound synchronization can be maintained. These single-system sound cameras have the advantages of being small in size and high in performance. An effective transport system is provided even though a large flywheel and sprocket device are not used. However, the potential of the existing systems is not realized because the film loop detector was less efficient than desired, and often electrical noise was introduced into the control and recording circuits causing irregularities of the speed of the intermittent mechanism and reduced fidelity of the amplifier.

The present invention describes improvements on the systems enabling more of the potential of fidelity and picturesound synchronization to be reached. A film speed control device and power supply for a single-system sound camera is described. The intermittent film transport mechanism at the exposure station and the constant speed film transport mechanism at the sound station are driven synchronously by separate motors. However, a control circuit modifies the rate of operation of the intermittent mechanism by responding to output of a high frequency coil which is electrically modified by a loop size sensor as the film loop size changes. Further, the output of the high frequency oscillator is used for alternating current bias for the magnetic recording head at the sound station. Further, the output of the high frequency oscillator is also used as a power source converter for the recording amplifier whereby a smaller than expected power supply can be used to energize the electrically powered camera mechanisms.

The above and other objects of the invention will become apparent from the detailed description which follows when taken in conjunction with the accompanying drawings in which like numbers refer to like parts.

Figure 2:
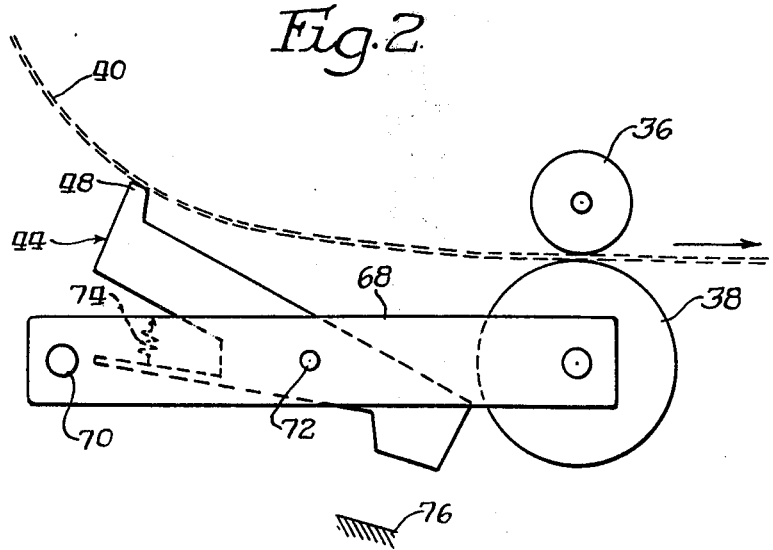

IN THE FIGURES:

FIG. 1 is a schematic representation of portions of a sound motion picture camera with parts omitted for clarity, and control circuitry for energizing and controlling portions of the camera; and FIG. 2 is a detail schematic view of an embodiment of a film loop sensor usable in this preferred construction.

Referring to the drawings, a film 10 is transported in a single system sound camera by an intermittently operating film transport device shown as shuttle 12. The film path extends between an image exposure station 14 in which the shuttle is arranged and which includes a pressure plate 18 to restrain film in the exposure aperture 20 aligned in the optical axis 22 of an objective lens 24. From the exposure station 14, the film is transported downstream to a sound station 30 including a transducer shown as a magnetic recording head 32, against which the film can be held by a pressure pad 34 and a constant speed drive mechanism comprising a powered capstan 36 and a pressure roller 38. Intermediate the exposure station and the sound station, the film path is formed as a loop 40 into which the film is fed intermittently by the shuttle and from which it is extracted continuously by the constant speed drive mechanism at the sound station. To maintain synchronization between the picture and sound, the film is ideally transported to move equal linear quantities through each station in a period of time. However, if the rates of the transporting mechanisms differ, the loop 40 varies in size depending on which mechanism is moving film at a greater rate. If the average speed of the shuttle 12 is slower than that of the capstan 36, the film loop 40 becomes smaller as shown by the dotted line path. Oppositely, if the shuttle is feeding film faster than the capstan, the loop becomes larger than the normalized solid line showing. Since variations in sound pitch are easier to detect than variations in the rate of movement in visual images, the capstan speed is maintained constant while the shuttle speed is varied as necessary to compensate for film movement variations.

A loop size detector 44 is arranged adjacent the film path at the loop 40 to sense the size of the loop for control of the shutter. The detector is an elongated member pivoted about an axle 46 to cause a film engaging portion 48 at one end thereof to be in continuous contact with the film under the influence of a biasing member shown as a spring 50. The detector is provided with a mass portion, movable relative to a sensor 52 in the form of a high frequency coil 54, preferably of ferrite. In this preferred embodiment, the mass portion is a permalloy plate of soft iron. The coil is excited by a high frequency oscillator 58 to operate in tens of thousand Hertz range. The coil 54 is connected to a circuit 60 to control speed of a motor (not shown) by which the shuttle is driven in a known manner. The motor is selected to be responsive to small current fluctuations. As the detector 44 is moved in response to the changes in the size of the film loop, the impedence of a coil 62 to which the motor control circuit is connected is modified to alter the speed of the motor. As the loop decreases from the solid line to the dotted line configuration, the detector 44 is moved clockwise about the pivot 46 away from the sensor coil. Through the speed control circuit 60, the shuttle 12 is moved slightly faster. On the other hand, if the average speed of the shuttle is faster than that of the capstan 36, the film loop 40 becomes larger causing the detector to rotate counterclockwise and to move the sensor toward the coil thereby reducing the speed of the motor until the loop becomes smaller.

The not shown motor, the amplifier 66 for energizing the transducer 32 and the high frequency oscillator 58 can be energized by the same power source, selected as a small low voltage battery, not shown. The high frequency oscillator 58 to which high frequency coil 54 is connected is supplied by an invertor functioning as a high frequency power source. Additionally, the output of the oscillator is used to provide a high frequency bias to the recording head 32. High voltages required for the amplifier to which the transducer is connected can be obtained by providing a voltage raising or step-up coil on the high frequency oscillator and rectifying the output of the step-up coil. By regulating the output voltage of the high frequency oscillator, high performance can be obtained from a single compact battery pack which can be replaced conveniently by the user.

To further improve the efficiency of the film loop size detector 44, the film engaging portion 48 is arranged at a preferred location between the exposure station 14 and the sound station 30. If the contacting portion is positioned too close to the transducer head 32 of the sound station, it cannot detect the change of the loop size. Similarly, if it is positioned too far from the sound station, the intermittent movement of the film is detected and the shuttle drive motor is controlled unstably. Therefore, for the arrangement as shown in which the film is transported from the shuttle to the recording head about a 90° bend, it is desirable that the position of the contact portion be located between 1/5 and ½ of the distance "L" from the recording head to the film descending position for a film having a 0.1–0.15mm thickness. Within the 1/5L to ½L range, the detector responds to small variations in the size of the loop thereby enabling a relatively constant loop size to be maintained.

The loop size detector 44 is constructed so that the contact portion 48 is removed from the film loop to enable easy loading and unloading of film when the pinch roller 38 is released from the capstan 36. As shown in another embodiment in FIG. 2, an arm 68 which is pivotable about an axle 70, supports the pinch roller 38 for limited movement from a sound gate open position to a sound gate closed position. The film loop size detector 44 is supported on an axis 72 mediate the arm 68 for rotation thereabout, with the end of the detector opposite the film contacting portion 48 continuously biased in the film engaging clockwise direction by a spring 74 connected to the arm 68. A stop 76 is provided on a fixed part of the camera to limit rotation of the film contacting portion beyond the anticipated operational range of that portion. When the arm is pivoted to position the detector against the limit stop 76 and the arm is held under this condition, the pinch roller 38 is separated from the capstan and the contacting portion 48 of the detector is separated from the film loop enabling easy loading and unloading of the film. When the arm 68 is released, the contacting portion 48 of the detector is returned to film engaging condition under the urging of spring 74 for normal operation.

While this invention has been particularly shown and described with respect to the preferred embodiment, it will be understood that various changes and modifications may be made without departing from the spirit and scope of the invention.

What is claimed is:
1. In a motion picture camera having an exposure station and a sound station through which a sound film is passed for simultaneous recording of picture and sound on the sound film, a film transport mechanism for intermittently moving the film through the exposure station and a mechanism for constantly moving the film through the sound station, said mechanisms being driven by respective motor means, a loop being formed by the film intermediate said exposure and sound stations, improvements in a film speed control device for maintaining picture-sound recording synchronization of the camera, comprising:
film engaging means mounted adjacent the film loop for pivotable movement responsive to displacement according to the size of the film loop;
a power source; oscillator circuit means connected to said power source for generating high frequency oscillations; and
high frequency coil means connected to said oscillator circuit means and responsive to relative movement of said film engaging means by said film loop to control said mechanism for intermittently moving film as impedence through said coil means is changed by changes in the size of said film loop causing displacement of said film engaging means relative to said coil means,
wherein the size of said film loop is maintained substantially constant whereby picture-sound synchronization is maintained.

2. Improvements in a motion picture camera film speed control device as in claim 1 including:
spring means for biasing said film engaging means toward engagement with said film loop at a location intermediate said exposure station and said sound station.

3. Improvements in a motion picture camera film speed control device as in claim 1 including a film driving capstan and a pressure roller arranged opposite said capstan at said sound station, said device including a pivotable arm supporting said pressure roller and said film engaging means for displacement into and from engagement with the film for loading and unloading of said camera.

4. In a motion picture camera having an exposure station and a sound station through which a sound film is passed for simultaneous recording of picture and sound on the sound film, with a loop being formed by the film intermediate said exposure and sound stations, a film transport mechanism for intermittently moving the film through the exposure station and a mechanism for constantly moving the film through the sound station, said mechanisms being driven by respective motor means, improvements in a film speed control device for maintaining picture-sound recording synchronization of the camera, comprising:
film engaging means mounted adjacent the film loop for pivotable movement responsive to displacement according to the size of the film loop;
a power source, oscillator circuit means connected to said power source for generating high frequency oscillations; and
high frequency coil means connected to said oscillator circuit means and responsive to relative movement of said film engaging means by said film loop to control said mechanism for intermittently moving film as impedence through said coil means is changed by changes in the size of said film loop causing displacement of said film engaging means relative to said coil means, wherein the size of said film loop is maintained substantially constant whereby picture-sound synchronization is maintained; and a magnetic recording head at said sound station wherein output of said high frequency oscillator circuit means is applied as an AC bias for said magnetic recording head.

5. Improvements in a motion picture camera film speed control device as in claim 4 further comprising a recording amplifier coupled to said recording head; and means for rectifying the output of said high frequency oscillator circuit means and applying said output as a power source for said recording amplifier coupled to said magnetic recording head.

* * * * *